United States Patent Office 2,987,494
Patented June 6, 1961

2,987,494
SOLUTIONS OF SYNTHETIC LINEAR POLYURETHANES IN DIMETHYLSULFOXIDE AND PROCESS OF MAKING SAME
William B. Black, Decatur, Ala., assignor to The Chemstrand Corporation, Decatur, Ala., a corporation of Delaware
No Drawing. Filed Mar. 26, 1958, Ser. No. 723,978
6 Claims. (Cl. 260—30.8)

This invention relates to compositions of matter, and more particularly, to new and useful compositions of matter comprising solutions of synthetic linear polyurethanes.

The polyurethanes embraced by this invention are those containing as an integral part of the main polymer chain recurring groups having the general formula

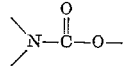

which groups are separated by at least two carbon atoms.

It is known that these synthetic linear polyurethanes are capable of being fabricated into many useful objects, including high-strength fibers and extrusion moldings. The conventional technique for preparing fibers and moldings from these polymers involves spinning, extruding, or otherwise forming the object from the molten polyurethane. However, many advantages over the melt extrusion processes accrue through the use of solutions to achieve the fluid state necessary in lacquers and dopes suitable for use in forming objects such as films, fibers, sheets, ribbons, bristles, and filaments. The application of lacquers and coatings and the formation of films and sheets from solutions are more easily carried out by known methods than the same operations with molten polymers. The incorporation of plasticizers or other modifying agents in polymers frequently encounters the problems of discoloration and decomposition when blending in the molten polymer, and may be more easily accomplished by addition to a solution of the polymers. Films and coatings of uniform thickness are much easier to obtain from solutions than from the higher viscosity molten compositions. Recovery of waste and scrap material from polyurethane manufacture, shaping, and fabrication is rendered feasible by the use of solutions. Thus, waste and scrap materials can be employed which contain contaminants or impurities such as dirt, oil, floor sweepings, delusterants, etc., rather than the absolutely clean materials required for remelting.

The solvents for the synthetic polyurethanes known to the prior art are not practical because of several disadvantages. They are characteristically corrosive media such as strong acids, phenols, cresols, and the like. Many are solvents only at or near the boil where solutions of polyurethanes of useful concentrations are needed. At the high temperatures and concentrations often required, degradation and discoloration of the polyurethanes are constant problems. Many solvents for polyurethanes require such high temperatures to maintain the polymers in solution that it is impracticable to spin these solutions into aqueous coagulating baths at temperatures below the boiling points of the baths. Consequently, a wet-spinning process has not been considered commercially feasible for the polyurethanes.

The primary purpose of this invention is the provision of new and useful compositions of matter comprising synthetic linear polyurethane solutions which are useful in making threads, filaments, bristles, ribbons, coatings, and the like. A further purpose of this invention is to provide a new low-cost solvent for the preparation of synthetic linear polyurethane fibers. A still further purpose is to provide compositions of matter comprising synthetic linear polyurethane solutions which may be wet-spun. Oother objects of the invention will become apparent from the description hereinafter.

It has now been found that these and other objects of the invention can be accomplished by dissolving in dimethylsulfoxide synthetic linear polyurethanes containing as an integral part of the main polymer chain recurring groups having the general formula

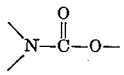

which groups are separated by at least two carbon atoms. The temperature to which it is necessary to heat a mixture of dimethylsulfoxide and a polyurethane such as those described in order to effect solution will depend upon the composition of the polyurethane. In general, homogenous solutions will result from heating to a temperature between about 140° and 180° C.

While each polymer varies somewhat in its solubility characteristics and the temperature of solvation, this invention is applicable to all synthetic linear polymers, including interpolymers and blends, containing as an integral part of the main polymer chain recurring groups having the general formula

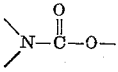

which groups are separated by at least two carbon atoms. Linear polyuretnanes may be tormed by polymerizing a bis-chloroformate of a suitable diol with a diamine, by polymerizing a suitable diol with a diisocyanate of a suitable diamine, by polymerizing a bis-carbamic ester of a diamine with a diol, by polymerizing a phenyl carbonic ester with a diamine and a diol, by condensing a bifunctional compound such as an aminoalcohol chloroformate, or by polymerizing the product of an ester-interchange reaction between an alkyl- or arylurethane and a suitable diol. The bis-chloroformates of the suitable diols may be obtained by reacting phosgene, i.e., carbonyl chloride, with the diol. The diisocyanates may be obtained by reacting phosgene with a suitable diamine.

Diols suitable for forming the polyurethanes useful in this invention include those containing at least two carbon atoms between the hydroxy groups, such as ethylene glycol, trimethylene glycol, 1,4-butanediol, 1,6-hexanediol, and 1,10-decanediol. Higher glycols where the alkylene chain contains a greater number of carbon atoms, straight chain or branched chain, are also satisfactory. Examples of other diols which can be employed are omega, omega′-dihydroxydialkyl ethers or thioethers, bis-glycol or diglycol esters of straight chain or branched chain aliphatic dicarboxylic acids, the diol dimer or trimer esters obtained by the conversion of an excess of an aliphatic glycol with a dicarboxylic acid, and cycloaliphatic glycols.

The diamines which can be employed in forming the polyurethanes with which this invention is concerned are ethylene diamine, trimethylene diamine, tetramethylene diamine, pentamethylene diamine, hexamethylene diamine, piperazine, ortho-, meta-, or para-phenylene diamines, cyclohexylene diamine, and nuclear substituted-phenylene diamines and nuclear substituted-cyclohexylene diamines. The polyurethanes may also be derived from more highly substituted diamines such as, for example, the omega, omega'-di-(aminoalkoxy)-alkanes, the bis-(omega-aminoalkyl) ethers, the bis-(omega-aminoalkyl)-sulfides, the omega, omega'-diaminodialkyl benzenes, diaminonaphthalenes, diaminobiphenyls, omega-aminoalkyl anilines, omega - aminoalkyl cyclohexylamines, diaminodiphenyl sulfones, diamino benzophenones, bis-(omega-aminoalkoxy) benzenes or bis-(omega-aminoalkoxy) cyclohexanes.

Dimethylsulfoxide is also a suitable solvent for interpolyurethanes derived from two or more different diamines such as ethylene diamine or tetramethylene diamine or tetramethylene diamine and piperazine, and those derived from two or more different diols, such as ethylene glycol and trimethylene glycol or ethylene glycol and 1,4-butanediol. The solvent of this invention is applicable to blends of two or more separately polymerized polyurethanes, such as a blend of 50 percent poly-tetramethylene-N,N'-ethylene carbamate and 50 percent poly-tetramethylene-N,N'-tetramethylene carbamate. Likewise, the solvent is suitable for forming blends of the polyurethanes with other synthetic linear condensation polymers, such as polyamides and polyesters. The polyurethanes and other linear polymers may be blended in solution by the use of dimethylsulfoxide.

The higher molecular weight polyurethanes (those having an intrinsic viscosity above 0.4 in meta-cresol) possess the inherent capability of being formed into filaments which can be cold drawn into fibers showing by characteristic X-ray patterns orientation along the fiber axis. Intrinsic viscosity of the synthetic linear polyurethanes is determined as $$\frac{\log_e \eta r}{C}$$

in which $\eta r$ is the viscosity of a very dilute solution (e.g., 0.5 percent) of the polyurethane divided by the viscosity of the meta-cresol at the same temperature (e.g., 25° C.) in the same units, and C is the concentration of polymer in grams per 100 cc. of solution. These high molecular weight varieties of the polyurethanes, though generally somewhat less soluble than the lower molecular weight varieties, are more useful for most purposes, since they excell in toughness and durability.

The following examples in which parts, proportions, and percentages are by weight illustrate further the application of the principles of the invention.

Example I

To one part of poly-tetramethylene-N,N'-diethylene carbamate, the polyurethane derived from piperazine and 1,4-butanediol bis-chloroformate, there was added three parts of dimethylsulfoxide and the mixture heated to 160° C. At this temperature solution of the polyurethane was complete and the solution became clear. This solution was suitable for casting into films as was demonstrated by pouring onto a glass plate preheated to 180° C. A film of good strength was thus formed which was quite flexible.

Example II

To two parts of poly-ethylene-N,N'-tetramethylene carbamate, derived from tetramethylene diamine and ethylene glycol bis-chloroformate, there was added four parts of dimethylsulfoxide and the mixture heated to 160° C. At this temperature solution of the polyurethane was complete and the solution became clear. This solution was suitable for extruding into a non-solvent coagulating bath to yield fibers or for casting films. Upon slow cooling the polymer did not precipitate until the solution temperature reached about 100° C.

Example III

To one part of the interpolyurethane composed of poly-tetramethylene-N,N'-tetramethylene carbamate and poly-tetramethylene-N,N'-diethylene carbamate as integral parts of the same polymer molecule, the polyurethane derived from 1 mole of piperazine, 1 mole of tetramethylene diamine, and 2 moles of 1,4-butanediol bis-chloroformate, there was added four parts of dimethylsulfoxide and the mixture heated to 160° C. At this temperature solution of the polyurethane was complete and the solution became clear. This solution was suitable for extruding into a non-solvent coagulating bath to yield fibers or for casting films. Upon slow cooling the polymer did not precipitate until the solution temperature reached about 115° C.

In the foregoing examples the invention has been illustrated with particular reference to solutions of poly-ethylene-N,N'-tetramethylene carbamate, poly-tetramethylene-N,N'-diethylene carbamate, and the interpolyurethane composed of poly-tetramethylene-N,N'-tetramethylene carbamate and poly-tetramethylene-N,N'-diethylene carbamate as integral parts of the same polymer molecule, but it is to be understood that the invention is not limited to these particular polyurethanes but rather to the synthetic linear polyurethanes as a class. Any of the polyurethanes, interpolyurethanes, or blends of polyurethanes described above can be substituted for those polyurethanes set forth in the examples with only minor changes in proportions and temperatures being required.

The properties of the objects formed from the compositions herein described may be modified by appropriate modification of the composition. Thus, the composition of this invention may have incorporated therein various modifying agents such as plasticizers, dyes, pigments, diluents, resins, cellulose derivatives, waxes, water repellents, luster modifying agents, flame repellents, and the like. Solutions of any of the synthetic linear polyurethanes can be solution blended and precipitated to give homogenous blends, where melt blending is undesirable or impractical.

Fibers and filaments can be prepared by either dry-spinning or wet-spinning into suitable coagulating baths. The compositions of the present invention are particularly useful for wet-spinning processes.

Although specific reference has been made to the use of solutions for the formation of films and filaments, the invention is not restricted thereto, since the solutions are useful for forming a variety of objects irrespective of the shape of the object. Typical objects which can be formed from the solutions are bristles, ribbons, sheets, and plasticized or otherwise modified solid compositions useful for making molded articles. The solutions are also useful for application as lacquers on wood, metal, glass, and other surfaces, for coating wire, fabrics, regenerated cellulose, and the like, and for impregnating fabric and other porous material.

As many widely different embodiments of this invention may be made without departing from the spirit and scope thereof, it is to be understood that the invention is not limited to the specific embodiments thereof except as defined in the appended claims.

I claim:

1. A composition of matter comprising a solution in dimethylsulfoxide of a synthetic linear polyurethane which is the product of reacting piperazine with 1,4-butanediol bis-chloroformate.

2. The composition of claim 1 wherein the synthetic linear polyurethane is the product of reacting substantially equimolar proportions of piperazine and 1,4-butanediol bis-chloroformate.

3. The composition of claim 1 wherein the synthetic linear polyurethane is the product of reacting piperazine, tetramethylene diamine, and 1,4-butanediol bis-chloroformate in a molar ratio of substantially 1:1:2.

4. A process for preparing a fiber-forming solution comprising mixing with dimethylsulfoxide a synthetic linear polyurethane which is the product of reacting piperazine with 1,4-butanediol bis-chloroformate and heating said mixture to a temperature of from 140° to 180° C., until the said polyurethane is substantially dissolved in the dimethylsulfoxide.

5. The process of claim 4 wherein the synthetic linear polyurethane is the product of reacting substantially equimolar proportions of piperazine and 1,4-butanediol bis-chloroformate.

6. The process of claim 4 wherein the synthetic linear polyurethane is the product of reacting piperazine, tetramethylene diamine, and 1,4-butanediol bis-chloroformate in a molar ratio of substantially 1:1:2.

References Cited in the file of this patent

UNITED STATES PATENTS

| | | |
|---|---|---|
| 2,682,518 | Caldwell | June 29, 1954 |
| 2,731,445 | Wittbecker | Jan. 17, 1956 |
| 2,811,497 | Ham | Oct. 29, 1957 |